United States Patent [19]

Hamos

[11] Patent Number: 5,320,140
[45] Date of Patent: Jun. 14, 1994

[54] FLUID VALVE SYSTEMS

[75] Inventor: Robert E. Hamos, Simi Valley, Calif.

[73] Assignee: Teledyne Industries, Inc., Los Angeles, Calif.

[21] Appl. No.: 5,799

[22] Filed: Jan. 19, 1993

Related U.S. Application Data

[62] Division of Ser. No. 897,799, Jun. 12, 1992, Pat. No. 5,211,195.

[51] Int. Cl.$^5$ ............................................. F16K 1/32
[52] U.S. Cl. ............................ 137/630.15; 137/599.2
[58] Field of Search ............ 137/599.2, 630.15, 630.13

[56] References Cited

U.S. PATENT DOCUMENTS

| | | | |
|---|---|---|---|
| 2,275,132 | 3/1942 | Crosthwait | 137/630.13 |
| 2,345,306 | 3/1944 | Van Der Werff | 137/630.13 X |
| 2,839,082 | 6/1958 | Moore et al. | 137/630.15 |
| 2,889,990 | 6/1954 | Loveland et al. | 137/599.2 X |
| 3,888,280 | 6/1975 | Tartaglia | 137/630.13 |
| 4,304,264 | 12/1981 | McClintock et al. | 137/630.15 X |
| 4,308,894 | 1/1982 | Carpentier | 137/630.15 |

Primary Examiner—John C. Fox
Attorney, Agent, or Firm—Benoit Law Corporation

[57] ABSTRACT

A fluid valve has a valve housing defining a corner and having a valve housing cover opposite that corner. That valve housing and cover enclose a valve chamber therein. A fluid inlet or outlet is in the valve housing cover. First and second valve seats for further fluid inlets or outlets are in first and second sides, respectively, of the corner in the valve chamber. A flapper is in that chamber for selectively closing the first valve seat and alternatively the second valve seat. A flapper actuator is in the corner of the valve housing. There may be an expansible valve closing member for each valve seat. Such expansible valve closing member may have an aperture paralleling that valve seat. A pilot valve may be at the expansible valve closing member for closing its aperture. Opening of the valve is initiated by moving the pilot valve away from the aperture in the expansible valve closing member, and such opening of the valve is completed by pulling the expansible valve closing member away from its valve seat.

19 Claims, 6 Drawing Sheets

FLUID VALVE SYSTEMS

CROSS-REFERENCE

This is a division of U.S. patent application Ser. No. 07/897,799, filed Jun. 12, 1992, U.S. Pat. No. 5,211,195, for Fluid Valve Systems, assigned to the common assignee and herewith incorporated by reference herein.

FIELD OF THE INVENTION

The subject invention resides in valving for water and other fluids, in fluid valve systems, in fluid circulating systems, and in valves.

OBJECTS OF THE INVENTION

It is an object of the invention to provide improved valves and valving.

It is also an object of the invention to provide improved methods and apparatus for circulating fluids.

It is a related object of the invention to provide improved methods and apparatus for circulating fluid alternatively through different bodies of fluid.

It is also an object of the invention to prevent valve sticking and to facilitate valve opening against suction or counterpressure.

Other objects of the invention will become apparent in the further course of this disclosure.

SUMMARY OF THE INVENTION

The invention resides in a valve apparatus, wherein a valve housing defines a corner and has a valve housing cover opposite that corner, such valve housing and cover enclosing a valve chamber therein, a fluid inlet or outlet in the valve housing cover, first and second valve seats for further fluid inlets or outlets in first and second sides, respectively, of the corner in the valve chamber, a flapper in that chamber for selectively closing the first valve seat and alternatively the second valve seat, and a flapper actuator in the corner of the valve housing.

The invention resides also in apparatus for selectively circulating fluid through a first body of fluid and alternatively through a second body of fluid via fluid supply and fluid return conduits. The invention according to this aspect resides in the improvement comprising, in combination, housing structure comprising separate first and second valve chambers having respectively a fluid inlet and a fluid outlet and first and second corners, first and second valve seats for fluid supply conduits for the first and second bodies of fluid in first and second sides, respectively, of the first corner in the first chamber, a first flapper in the first chamber for selectively closing the first valve seat and alternatively the second valve seat, third and fourth valve seats for fluid return conduits for the first and second bodies of fluid in first and second sides, respectively, of the second corner in the second chamber, a second flapper in the second chamber for selectively closing the third valve seat and alternatively the fourth valve seat, and an actuator for the first and second flappers.

The invention resides also in a method of selectively circulating fluid through a first body of fluid and alternatively through a second body of fluid via fluid supply and fluid return conduits. The invention according to this aspect resides in the improvement comprising, in combination, providing separate first and second valve chambers with first and second corners, respectively, providing first and second valve seats for fluid supply conduits for the first and second bodies of fluid in first and second sides, respectively, of the first corner in the first chamber, providing the first chamber with a fluid inlet for the first and second valve seats, providing in the first chamber a first flapper for selectively closing the first valve seat and alternatively the second valve seat relative to the fluid inlet, providing third and fourth valve seats for fluid return conduits for the first and second bodies of fluid in first and second sides, respectively, of the second corner in the second chamber, providing the second chamber with a fluid outlet for the third and fourth valve seats, providing in the second chamber a second flapper for selectively closing the third valve seat and alternatively the fourth valve seat relative to the fluid outlet, and ganging the first and second flappers for joint actuation.

The invention moreover resides in a method of selectively circulating fluid through a valve seat in a fluid valve, comprising, in combination, providing an expansible valve closing member for the valve seat, providing the expansible valve closing member with an aperture paralleling the valve seat, providing a pilot valve at the expansible valve closing member for closing that aperture, closing the valve seat with the expansible valve closing member and the pilot valve at that aperture, moving the pilot valve away from that aperture in the expansible valve closing member for an opening of the valve, and completing that opening of the valve by pulling the expansible valve closing member away from the valve seat.

BRIEF DESCRIPTION OF THE DRAWINGS

The subject invention and its various aspects and objects will become more readily apparent from the following detailed description of preferred embodiments thereof, illustrated by way of example in the accompanying drawings, in which like reference numerals designate like or equivalent parts, and in which.

DESCRIPTION OF PREFERRED EMBODIMENTS

Figure 2:
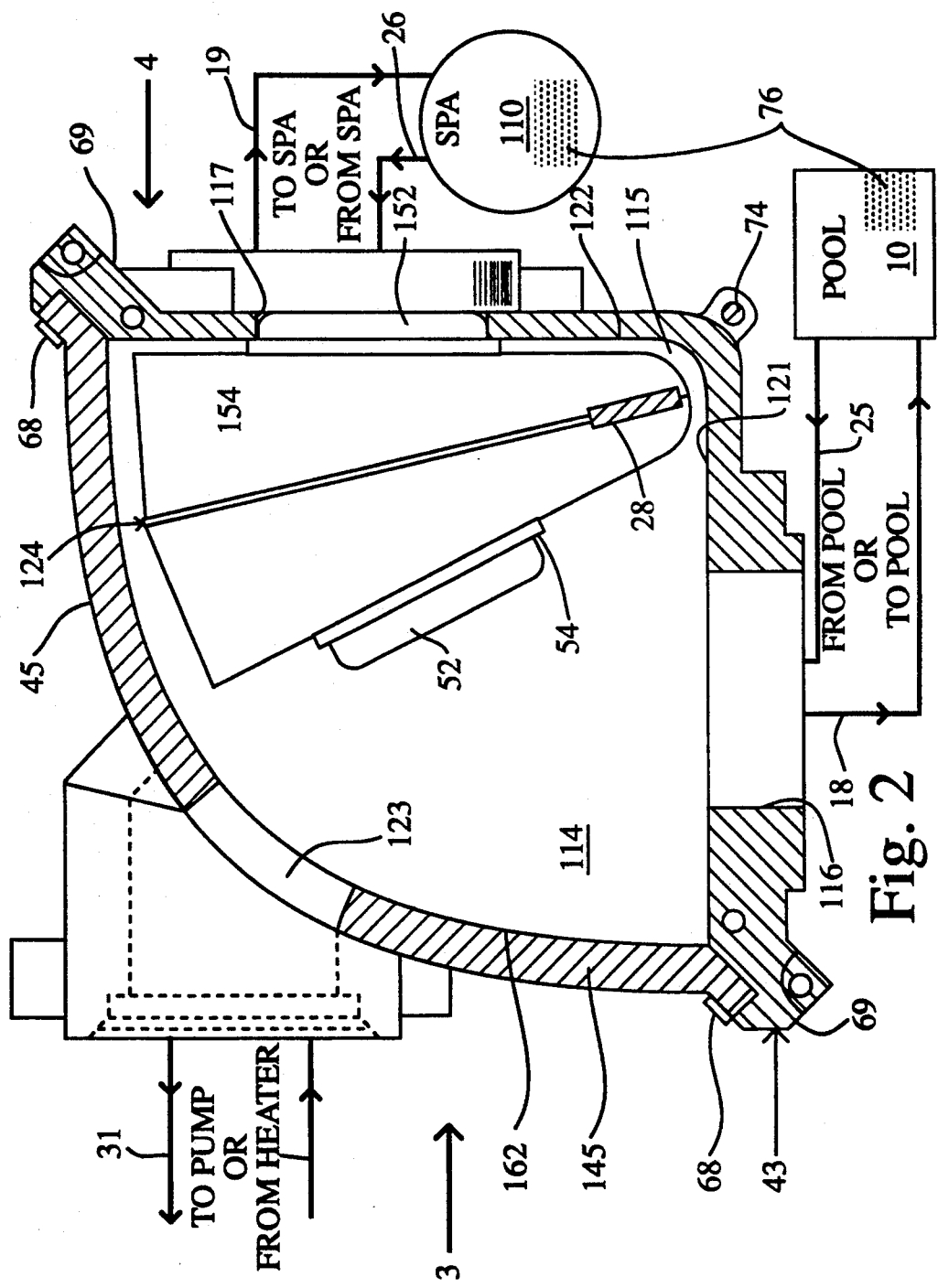
FIG. 2 is a section taken on the line 2—2 in FIG. 3.
Figure 3:
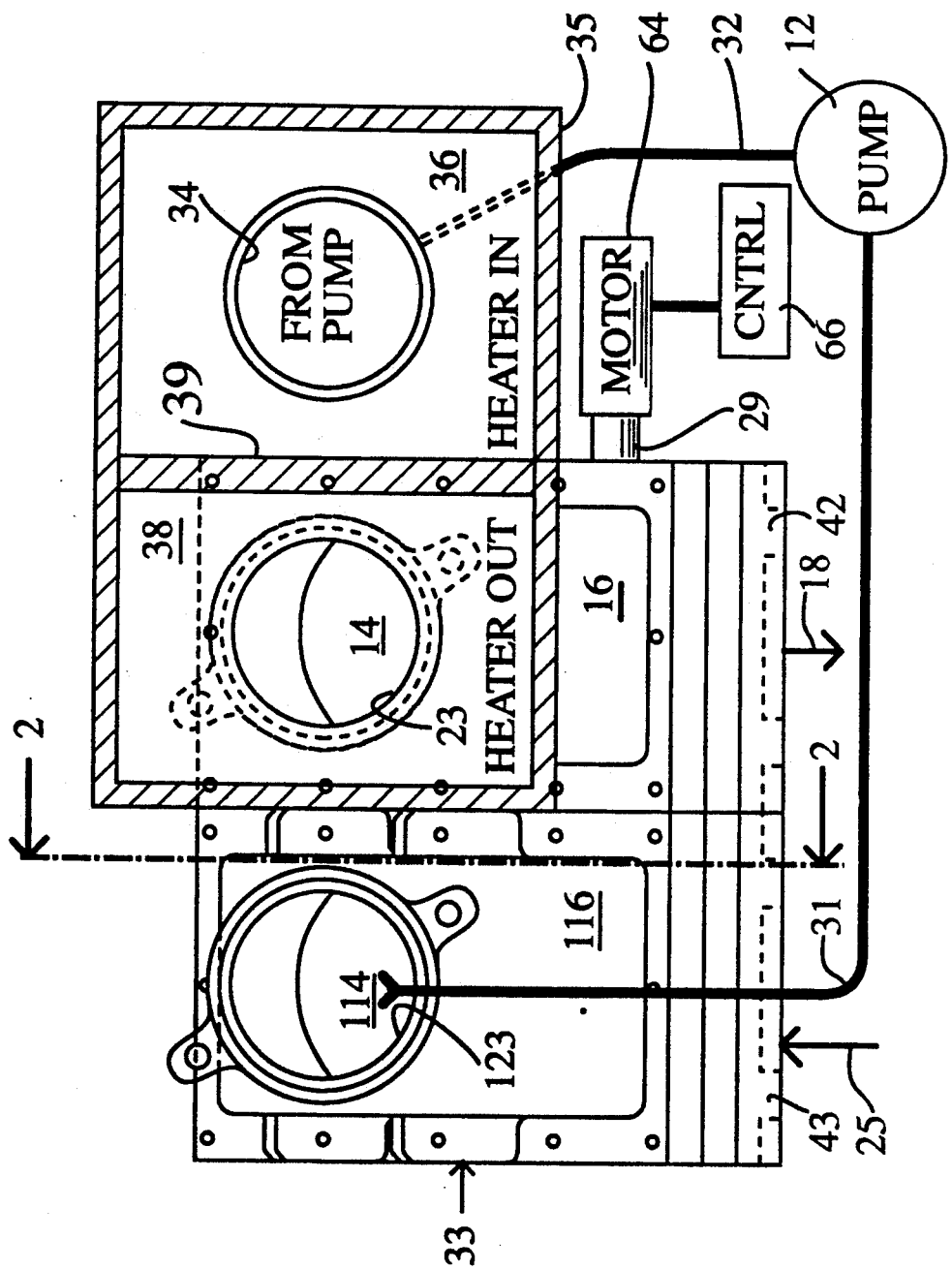
FIG. 3 is a front elevation of the valve apparatus of FIGS. 1 and 2 as seen in the direction of arrow 3 in FIGS. 1 and 2, but partially hidden by a pump and heater header not shown in FIGS. 1 and 2.

The drawings illustrate methods and apparatus for selectively circulating fluid through a first body of fluid and alternatively through a second body of fluid, with a pump via fluid supply and fluid return conduits. By way of example, the first body may be a swimming pool or pool of water 10, and the second body may be a spa or other body of water 110. The pump may be a filter pump 12 having a fluid or water heater 13 connected in series therewith for heating the fluid or water, preferably after the pump, as shown in FIGS. 2 and 3. However, embodiments of the invention extend to systems working with air, gas, water or another fluid, and with a cooler, heater or other changer of fluid temperature.

The invention in general provides separate first and second valve chambers 14 and 114 with first and second corners 15 and 115, respectively. The invention further provides first and second valve seats 16 and 17 for fluid delivery or supply conduits 18 and 19 for the first and second bodies of fluid 10 and 110 in first and second sides 21 and 22, respectively, of the first corner 15 in the first chamber 14. The invention further provides the first chamber 14 with a fluid inlet 23 for the first and second valve seats 16 and 17, and provides in that first chamber a first flapper 24 for selectively closing the first valve seat 16 and alternatively the second valve seat 17 relative to that fluid inlet 23.

The invention also provides third and fourth valve seats 116 and 117 for fluid return conduits 25 and 26 for the first and second bodies of fluid 10 and 110 in first and second sides 121 and 122, respectively, of the second corner 115 in the second chamber 114. The invention moreover provides the second chamber 114 with a fluid outlet 123 for the third and fourth valve seats 116 and 117, and provides in that second chamber a second flapper 124 for selectively closing the third valve seat 116 and alternatively the fourth valve seat 117 relative to that fluid outlet 123.

The first and second flappers 24 and 124 are ganged for joint actuation. A flat shaft 28 is shown in FIGS. 2 and 5 for that purpose, extending into the round shaft 29 shown in FIGS. 1, 3 and 4.

Figure 1:
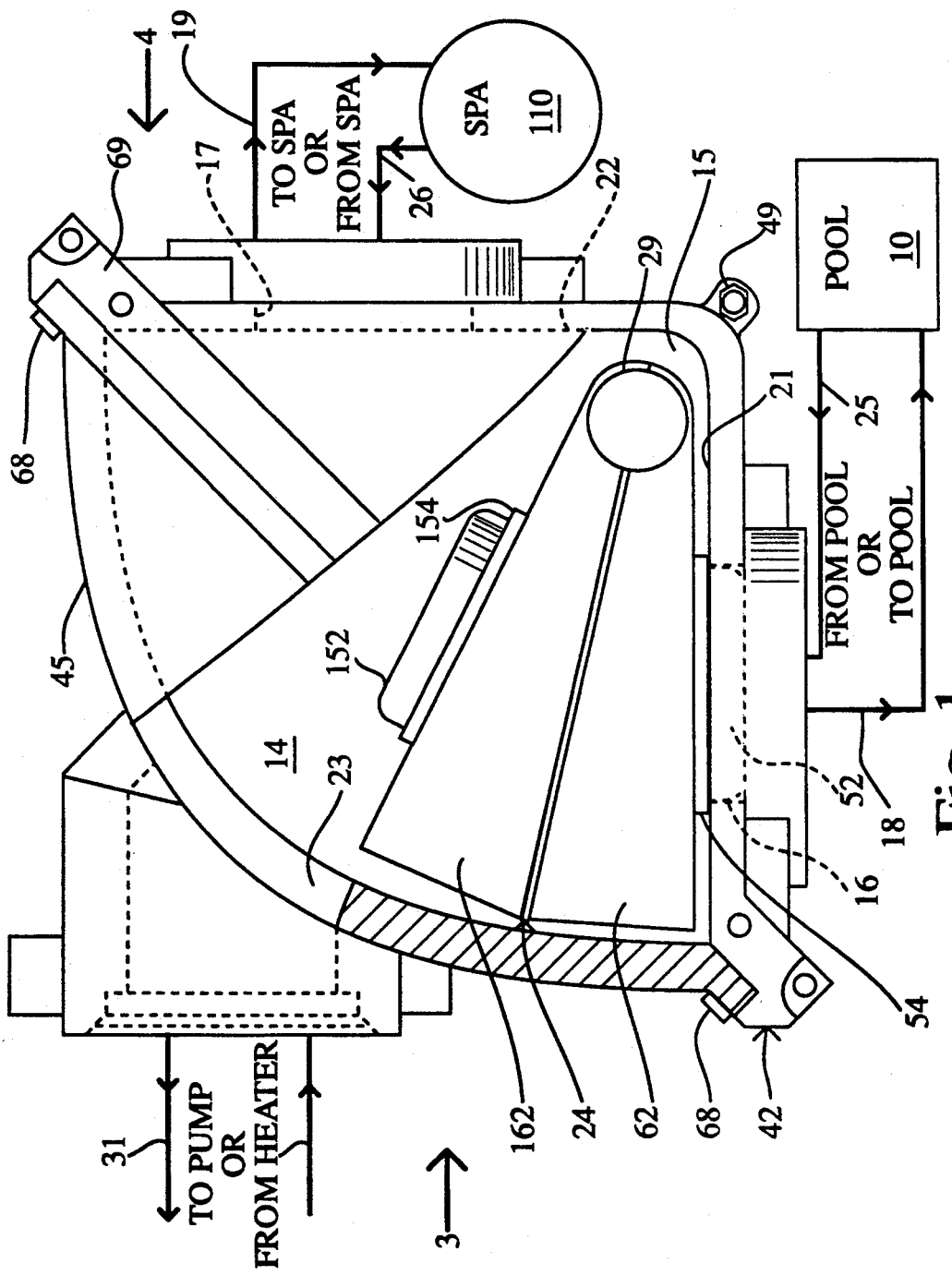
FIG. 1 is a side view, partially broken away, of valve apparatus according to a preferred embodiment of the invention.

By way of contrast, FIGS. 1 and 2 show the flappers 24 and 124 at opposite positions. However, if these flappers are ganged as shown in FIGS. 1 to 5, then they both at the same time have to be either in their first position shown for the flapper 24 in FIG. 1, or in their alternative second position shown for the flapper 124 in FIG. 2.

On the other hand, if what is shown in FIG. 1 is the first position for the flapper 24 and the second position of the flapper 124, and what is shown in FIG. 2 is the second position of the flapper 24 and the first position of the flapper 124, then the flappers have to be ganged through gears or electronically through distinct drives, if joint or simultaneous actuation between their first and second positions is desired.

An embodiment of the invention pumps fluid from the fluid outlet 123 into the fluid inlet 23, such as with the pump 12. Likewise an embodiment of the invention changes the temperature of the fluid circulating through the first body of fluid 10 and alternatively through the second body of fluid 110. By way of example, a heater or a cooler may be used for that purpose. For instance, if the bodies of fluid are air in different rooms, an air conditioner, an air heater or an air conditioner/heater unit may be used between the outlet 123 and inlet 23. The pump in such case may be an air blower combined with the air conditioner or heater.

That also applies if the fluid is, for instance, water, such as swimming pool and spa water. In that case, the temperature changing apparatus may be a gas water heater 13, for instance.

By way of example, the valve outlet 123 is connected by a fluid conduit 31 to the inlet of the pump 12. A further fluid conduit 32 connects the pump outlet to an inlet 34 of the heater 13. In this respect, the heater may have a header 35 having a heater inlet chamber 36 that leads to a heat exchanger (not shown) in which the water or other fluid is heated, such as by combustion of gas. The output of that heat exchanger issues into a heater outlet chamber 38 separated in the header 35 from the inlet chamber 36 by a wall 39.

Water or other fluid is thus circulated by the pump or blower 12 through the heater or other fluid temperature changer 13 and hence through the fluid inlet 23 and chamber 14 and through the valve seat 16 or the valve seat 17, depending on the position of the flapper 24, and hence through the conduit 18 to the pool, or through the conduit 19 to the spa.

For instance, if both flappers 24 and 124 are in the flapper position shown in FIG. 2, heated or cooled fluid is pumped via conduit 18 to the first body of fluid 10 for circulation therethrough, and is returned via conduit 25, valve seat 116, valve chamber 114, valve outlet 123, and pump inlet conduit 31, to the pump 12 for further circulation.

Alternatively, if both flappers 24 and 124 are in the flapper position shown in FIG. 1, then heated or cooled fluid is pumped via conduit 19 to the second body of fluid 110 for circulation therethrough, and is returned via conduit 26, valve seat 117, valve chamber 114, valve outlet 123 and pump inlet conduit 31 to the pump 12 for further circulation.

Figure 4:
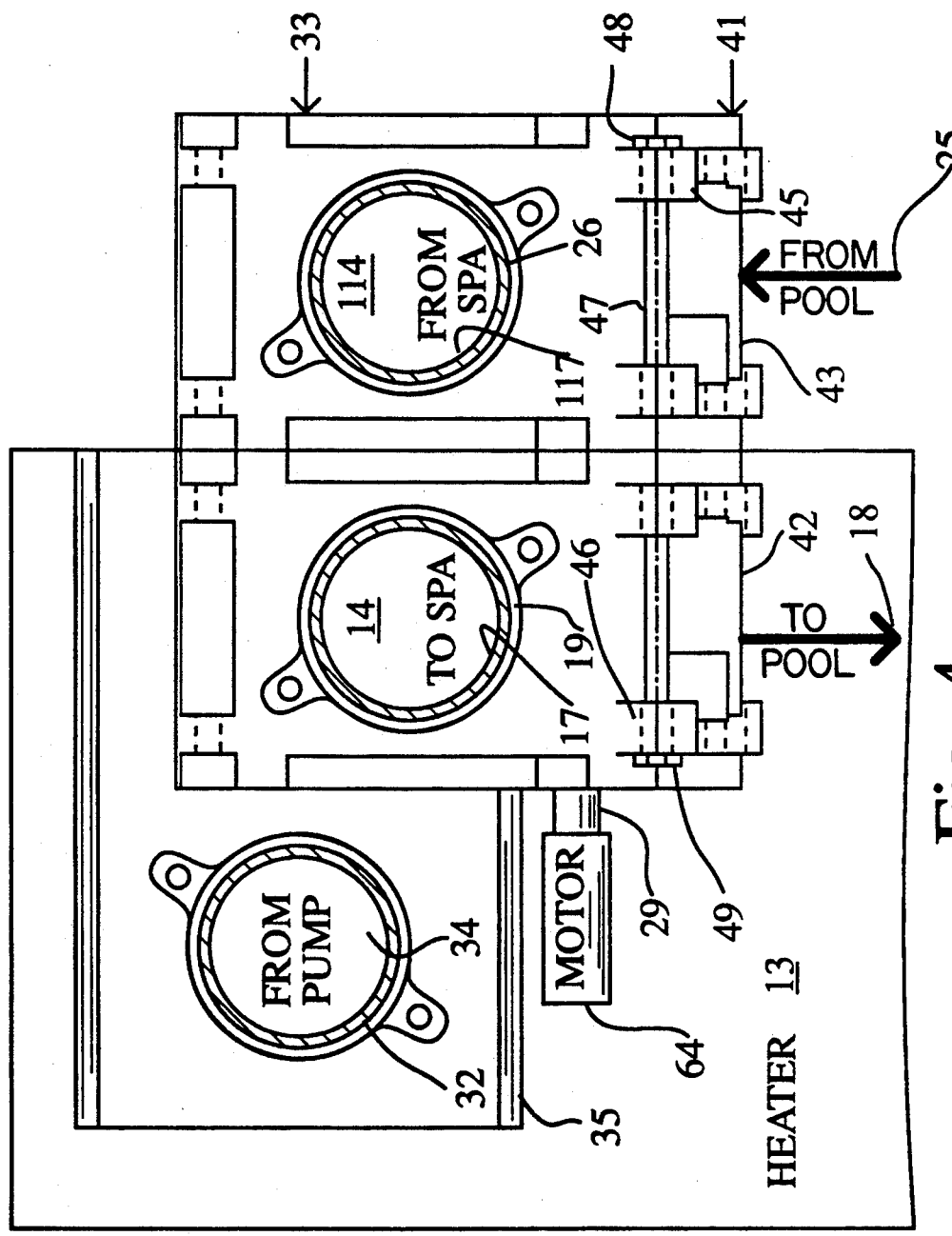
FIG. 4 is a rear elevation of the valve apparatus of FIGS. 1 and 2, seen in the direction of arrow 4 in FIGS. 1 and 2, and a front view of the pump and heater header seen in FIG. 3, and attached to a heater partially seen in that FIG. 3.
Figure 5:
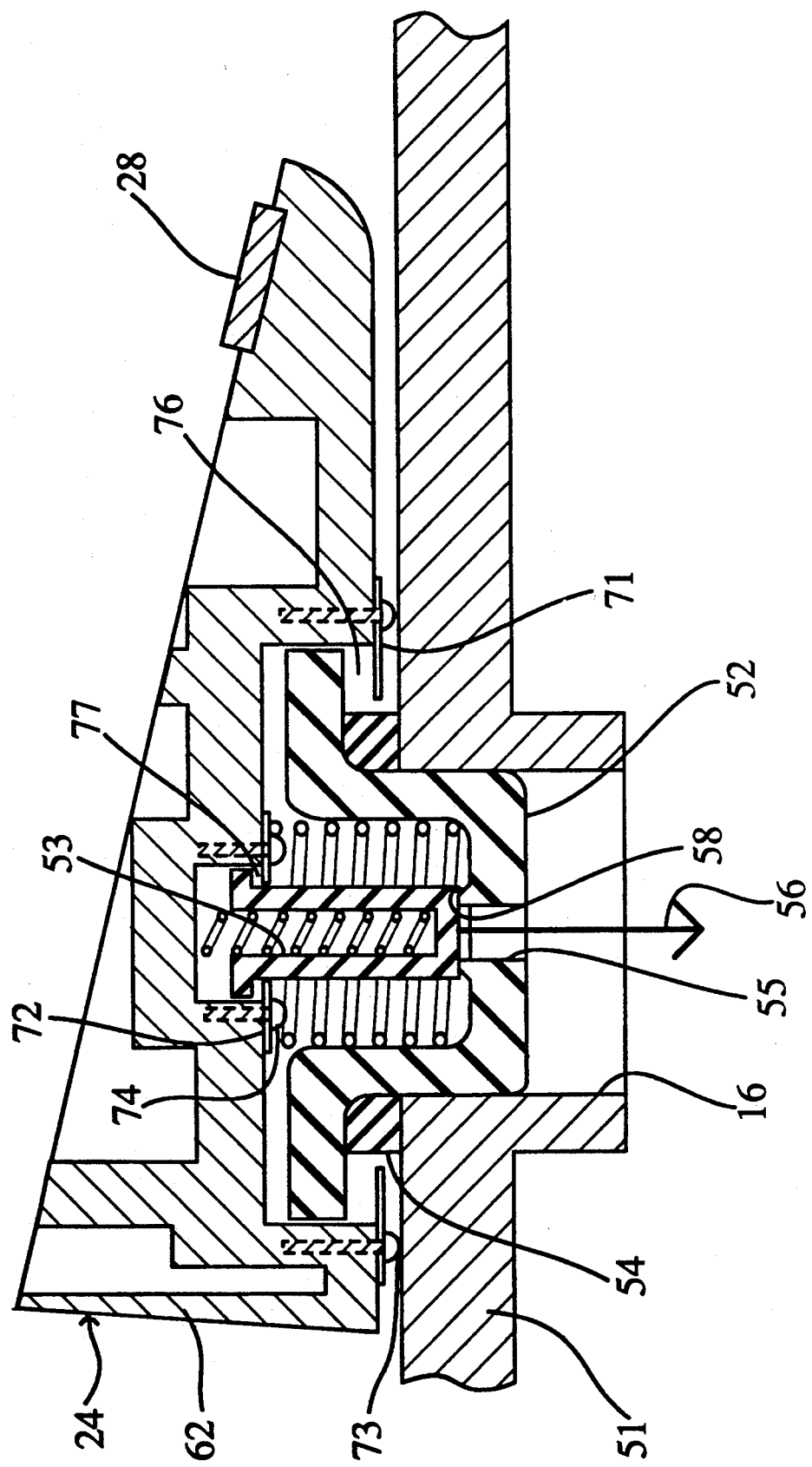
FIGS. 5 and 6 are a section of a valve flapper usable in the apparatus of FIGS. 1 to 3.

The heater 13 is preferably connected in series with and after the pump, as shown in FIGS. 3 and 4, so that the pump will not be unduly heated. The same arrangement may be used if the temperature changing apparatus is a cooler, air conditioner or heater/air conditioner.

However, if the temperature changing apparatus 13 is only a cooler or air conditioner, then that cooler or air conditioner may be connected in series with and ahead of the pump 12, so as to help cooling the pump. That is not intended to change the claim language following this specification, since "first", "second", "third", "fourth", "inlet" and "outlet" may then be reversed, and the pump inlet 31 may become a pump outlet, the pump outlet 32 a pump inlet, the header inlet 36 a header outlet, and the header outlet 38 a header inlet, all within the broad claim language.

Labeled lines 18, 19, 25, 26 and 31 and a line labeled "FROM HEATER," are shown in the alternative in FIGS. 1 and 2 to illustrate different possibilities.

Within the scope of the invention, fluid circulation may be effected by pumping without induced temperature change.

The first and second valve chambers 14 and 114 with inlet 23, outlet 123, flappers 24 and 124, and valve seats 16, 17, 116 and 117 may be provided or comprised in a common or integral housing structure 41. On the other hand, that housing structure may be composed of two different valve housings 42 and 43, such as shown in FIGS. 1 and 2, respectively. Even then, the valve housings 42 and 43 may be integrated into a joint or common housing structure 41, such as with the aid of lugs 45 and 46, one or more tie bars 47, and fasteners 48 and 49.

In this respect, the housing structure 41 includes a first housing 42 comprising the first valve chamber 14, fluid inlet 23, first and second valve seats 16 and 17, and the first flapper 24, and a second housing 43 comprising the second valve chamber 114, fluid outlet 123, third and fourth valve seats, and second flapper 124. The actuator 29 extends into the first and second housings 42 and 43 and may be composed of two parts having a coupling (not shown) therebetween where the two housings meet. Two, three or more housings may be combined in this manner.

On the other hand, any of the valves may be used separately for all kinds of applications.

In either case, the valve housing 42 or 43 defines a corner 15 or 115 and has a valve housing cover 45 or 145 opposite that corner. That valve housing 42 or 43 and cover 45 or 145 enclose the valve chamber 14 or 114 therein. The fluid inlet 23 or outlet 123 is in the valve housing cover 45 or 145. The first and second valve seats 16 and 17 for further fluid inlets or outlets are in first and second sides 21 and 22, respectively, of the corner 15 in the chamber 14. The flapper 24 is again in the chamber 14 for selectively closing the first valve seat 16 and alternatively the second valve seat 17. A flapper actuator 28 or 29 is in the corner 15 or 115. This applies to the valve shown in FIG. 1 and to the valve shown in FIG. 2.

The valve housing cover 45 or 145 has a curvature about a radius from the corner 15 or 115 corresponding to a length of the flapper 24 or 124 from that corner.

FIG. 5 shows a detail that may be used in any of the FIGS. 1 to 4 or in many other kinds of valves. In this respect, FIG. 5 is illustrative of methods and apparatus for selectively circulating fluid through a valve seat 16, 17, 116, 117 or 216 in a fluid valve 42, 43 or 51. That aspect of the invention provides an expansible valve closing member 52 or 152 for that valve seat, and provides that expansible valve closing member with an aperture 55 shown intermediate the valve seat 16 in FIG. 5. However, that aperture 55 may otherwise parallel or shunt the valve seat 16 or extend in parallel thereto.

That aspect of the invention also provides a moveable pilot valve 53 at each of the expansible valve closing members 52 or 152 for closing the aperture 55, such as shown in FIG. 5. The valve seat is closed with the expansible valve closing member 52 or 152, as shown by way of example for the valve seat 16 and 117 in FIGS. 1 and 2, and in FIG. 5 showing also the closing of the aperture 55 by the pilot valve 53.

What may be termed a first valve seat 16 is thus shown closed with the expansible valve closing member 52 and the pilot valve 53 at the aperture 55 which may have a second valve seat 58 for the pilot valve 53. An elastomeric ring or gasket 54 or 154 may assist the closure of the valve seat 16, 17, 116 or 117.

By way of example, the flapper may be moved from the flapper position shown in FIG. 2 to the position shown in FIGS. 1 and 5 to close the valve seat 16 or 116. Conversely, the flapper may be moved from the flapper position shown in FIG. 1 to the flapper position shown in FIG. 2 to close the valve seat 17 in FIG. 1 or the valve seat 117 in FIG. 2.

Either a suction in the pipe (e.g. 18) leading away from the valve seat 16, or pressure in the valve chamber 14 or otherwise above the valve seat or flapper, will develop at the pilot valve 53 a force symbolized by the arrow 56 in FIG. 5. By way of example, the aperture 55 in the expansible valve closing member 52 is closed by applying fluid pressure to the expansible pilot valve 53, such as with the pump 12 through the heater 13 and valve chamber 14.

In this or any other manner, the pilot valve 53 is caused to close the aperture 55. By way of example, the aperture 55 may be closed by the part of the elastomeric valve closing member 52 containing the aperture 55 being pushed upward against the spring-biased pilot valve 53 whereby the aperture 55 is sealed at the pilot valve seat 58 while the valve closing member 52 remains in the valve seat 16 until the flapper 24 is moved away from that valve seat.

In this respect, the valve closure members 52 and 152 and pilot valves 52 may be releasably retained on the flappers 24 and 124 by retaining rings 71 and 72 mounted by screws 73 and 74 or other fasteners. As seen in FIG. 5, an enlarged end portion of the valve closure member 52 is movable relative to the retaining ring 71 in a corresponding cavity of the flapper 24. Similarly, an enlarged end portion of the pilot valve 52 is movable relative to the retaining ring 72 is another corresponding cavity of that flapper 24.

It may be noted from FIG. 5 that the enlarged end portion of the valve closure member 52 is spaced inwardly of the retaining ring 71 at 76 when the valve 51 is closed. Also, the enlarged end portion of the pilot valve 53 is spaced inwardly of the retaining ring 72 at 77 when the opening 55 is closed by that pilot valve 53 at 58.

The spacing at 76 is larger than the spacing at 77 so that the pilot valve 53 will be moved or pulled away from its valve seat 58 when the flapper 24 is moved away from the valve seat 16 while the valve closure member 52 is still in that valve seat.

In this respect and in general, the flapper 124 may be moved from the position shown in FIG. 2 to the flapper position shown in FIGS. 1 and 2 to open the valve at seat 117. Similarly, the flapper 24 may be moved from the position shown in FIGS. 1 and 5 to open the valve at valve seat 16 or, broadly, to open the valve 51.

In particular, such movement of the flapper 24 results in movement of the expansible valve closing member 52 away from the valve seat 16 for an opening of the valve 51. However, such movement of the flapper may not immediately open the valve, since the expansible member 52 may be stuck at the valve seat 16, especially if there is suction in the pipe leading from the valve seat 16, such as suction caused by the pump 12 or by gravity or other effects in a long fluid conducting line, or if there is pressure in the valve chamber.

Accordingly, an embodiment of the invention moves the expansible pilot valve 53 away from its seat 58 or aperture 55 preparatory to or for an opening of the valve. For instance, if the enlarged portion of the pilot valve 53 is spaced less at 77 from its retainer 72, than the spacing at 76 of the enlarged portion of the valve closure member 52 from its retainer 71, then the upper retainer 72 will engage the enlarged portion of the pilot valve 53 before the lower retainer 71 engages the enlarged portion of the valve closure member 52, while the flapper 24 is moving away from the valve seat 16.

The pilot valve 53 thus moves away from its pilot valve seat 58 and fluid may thus discharge from the valve chamber through the aperture 55 as shown at 59. Such discharge may thus commence before the valve closing member 52 is pulled away from its valve seat 16 by the moving flapper 24. Such discharge 59 then assists breakaway or separation of the valve closing member 52 from the valve seat 16 and thereby assists the opening of the valve 42, 43 or 51 or of any other valve using the currently discussed aspect of the invention.

Opening of any valve seat may thus be initiated by moving the corresponding pilot valve 53 away from aperture 55, and opening of the valve seat 16 and may be completed by pulling the expansible valve closing member 52 away from that valve seat 16, so that fluid may then freely flow through the open valve seat and through piping connected thereto.

It may be noted in this respect that the illustrated preferred embodiment of the invention provides a so-called "lost-motion connection" between the enlarged portion of the valve closure member 52 and its retainer 71. In this respect it may be said that the aperture 55 in the expansible valve closing member is closed by providing a lost-motion connection at 76 between that expansible valve closing member 52 and the flapper 24 or other actuator of the expansible valve closing member.

The illustrated embodiment of the invention according to FIG. 5, provides a first lost-motion connection at 76 between the expansible valve closing member 52 and flapper 24 or other actuator of that expansible valve closing member, and provides a second lost-motion connection at 77 between the pilot valve 53 and that flapper or other actuator. Such second lost-motion connection at 77 is smaller than the first lost-motion connection 76 or, in other words, the lost-motion connection at 76 is larger than any lost-motion connection at 77 so that the pilot valve seat 58 opens first when the flapper 24 starts moving away from the valve seat 16.

In apparatus terms, the valve apparatus 42, 43 or 51 has a valve seat 16, 17, 116 or 117, an expansible valve closing member 52 or 152 for that valve seat, an aperture 55 in that expansible pilot valve intermediate or otherwise in parallel to the valve seat, and an expansible pilot valve 53 at that aperture for closing that aperture 55. Structurally speaking, it may be said that the aperture 55 is in the path of expansion of the pilot valve 53.

According to the illustrated preferred embodiment, the expansible valve closing member 52, the aperture 55, and the expansible pilot valve 53 are concentric or concentrically arranged. However, a variety of all kinds of different arrangements are possible within the scope of the invention.

FIG. 5 also shows a flapper structure 62 for mounting the valve member 52 and the pilot valve 53. As seen in FIG. 1, that structure 62 and a similar structure 162 presenting a mirror image thereof, may be used to provide the flapper 24 or its counterpart 124.

The structures 62 and 162 may jointly contain the flat shaft 28 and may be tied together by suitable fasteners.

By way of example, the valve closing members 52 and 152, the gaskets 54 and 154, and the pilot valves 53 and 153 may be made of an elastomer, including rubber or a synthetic elastomer. Typically the pilot valve 53 is made of harder material than the valve closure member 52. The closing members 52 and 152 and the pilot valve may also be spring-biased internally toward their retainers 71 and 72, as shown in FIG. 5 by way of example.

The flappers 24 and 124 may be actuated manually or with a motor 64 actuated by a motor control 66. That control may be of a conventional type, driving the motor to move the flappers 24 and 124 through shaft or coupling 29 and shaft 28 angularly in a first direction, such as from the position shown in FIG. 1 to the position shown in FIG. 2, and alternatively in an opposite second direction, such as from the position shown in FIG. 2 back to the position shown in FIG. 1.

Swimming pool and spa controls for switching diverter valves are good examples of such controls, but there are many other reciprocal controls and reciprocating drives known for valve actuation and other purposes.

For reciprocating operation, the flapper 24 has expansible valve closing members 52 and 152 so that each valve seat 16 and 17 has a corresponding valve closing member on that flapper, and pilot valves 53 on that flapper so that each valve closing member has a corresponding pilot valve thereat (visible in FIG. 5 and present but not visible in FIGS. 1 and 2).

Apertures 55 in the expansible valve closing member 52 and 152 are mounted in the paths 58 of the pilot valves 53 for selective closure of the apertures, one of which is seen at 55.

In the case of valve structures or multiple valves with two or more flappers, such flappers 24 and 124 may be provided with expansible valve closing members so that each valve seat 16, 17, and 116, and 117 has a corresponding expansible valve closing member 52 or 152 on a corresponding one of such flappers 24 and 124 respectively.

All or some of the expansible valve closing members 52 or 152 may be provided with apertures 55 paralleling their valve seats 16, 17, 116 or 117. The flappers are also provided with a pilot valve 54 for each aperture 55.

Any valve seat 16 or 17 and 116 or 117 is closed with its corresponding expansible valve closing member 52 and 152 on its corresponding flapper 24 and 124, respectively, moved toward that valve seat, and with its corresponding pilot valve 53 on the aperture 55 of the corresponding valve closing member 52 or 152, such as shown in FIG. 5 and described above.

Figure 6:
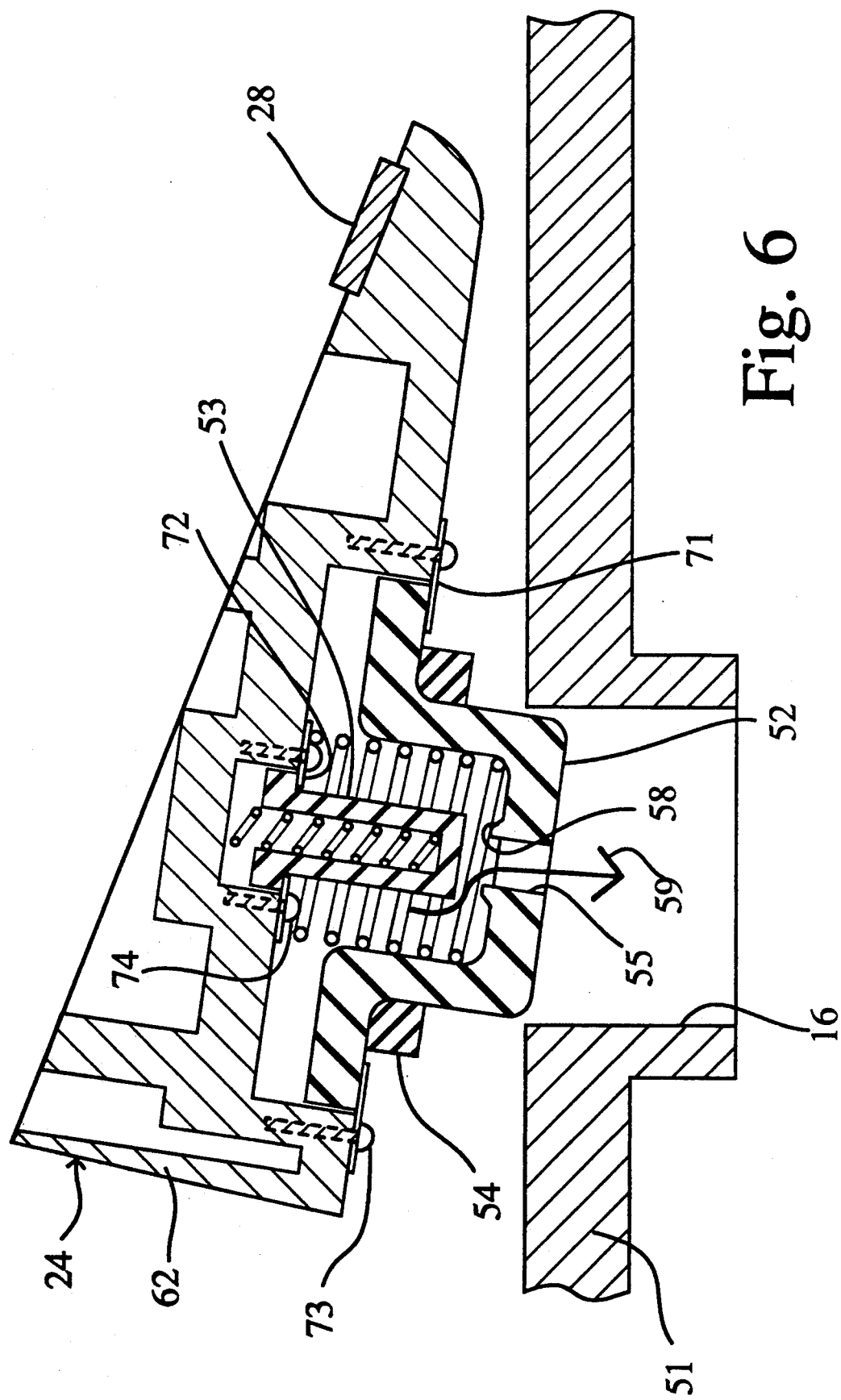

Conversely, any valve seat may be opened by moving the corresponding pilot valve 53 away from its corresponding aperture 55, such as shown in FIG. 6 and described above, and an opening of the corresponding valve seat is completed by moving the corresponding flapper 24 or 124 away from that valve seat or by otherwise pulling the corresponding expansible valve closing member away from that valve seat 16, 17, 116 or 117.

The flappers and their elements, including valve closure members 52 and 152 and pilot valves 53 are easily serviced from time to time or whenever necessary in the illustrated embodiments.

For instance, the curved valve covers 45 and 145 are easily removed and refastened with simple fasteners 68 and fit into a bracket structure 69 on the corner-shaped housings of the valves 42 and 43.

The valve closure members 52 and 152 and pilot valves 52 are releasably retained by retaining rings 71 and 72 mounted by screws 73 and 74 or other fasteners for easy replacement thereof.

If the flappers 24 and 124 are in the position illustrated for flapper 24 in FIG. 1, then water or other fluid 76 is circulated by the pump 12 through the pump outlet conduit 32, heater or other temperature changing apparatus 13, valve inlet 23, chamber 14 of valve 42, open valve seat 17, spa supply or delivery conduit 19, spa or body of fluid 110, spa return conduit 26, then open valve seat 117, chamber 114 of valve 43, outlet 123, and pump return or inlet conduit 31.

If the control 66 energizes the motor 64 to angularly move the flappers 24 and 124 to the position shown for the flapper 124 in FIG. 2, then water or other fluid 76 is circulated by the pump 12 through the pump outlet conduit 32, heater or other temperature changing apparatus 13, valve inlet 23, chamber 14 of valve 42, then open valve seat 16, pool supply or delivery conduit 18, pool or body of fluid 10, pool return conduit 25, open valve seat 116, chamber 114 of valve 43, outlet 123, and pump or blower return or inlet 31.

The subject extensive disclosure will render apparent or suggest to those skilled in the art various modifications and variations within the spirit and scope of the subject invention and equivalents thereof.

I claim:

1. In a method of selectively circulating fluid through a valve seat in a fluid valve, comprising in combination:

providing an expansible valve closing member for said valve seat;

providing said expansible valve closing member with an aperture paralleling said valve seat:

providing a pilot valve at said expansible valve closing member for closing said aperture;

said pilot valve being made of harder material than said expansible valve closing member;

closing said valve seat with said expansible valve closing member and said pilot valve at said aperture;

moving said pilot valve away from said aperture in said expansible valve closing member for an opening of said valve; and completing said opening of said valve by pulling said expansible valve closing member away from said valve seat.

2. A method as in claim 1, wherein:
said expansible valve closing member is made of an elastomer.

3. A method as in claim 2, wherein:
said pilot valve is made of an elastomer harder than the elastomer of said expansible valve closing member.

4. A method as in claim 1, including:
providing a single actuator for said expansible valve closing member and for said pilot valve; and
closing said aperture in said expansible valve closing member by providing a lost-motion connection between said expansible valve closing member and said single actuator, and by moving said single actuator toward said valve seat.

5. A method as in claim 1, including:
providing a single actuator for said expansible valve closing member and for said pilot valve;
providing a first lost-motion connection between said expansible valve closing member and said single actuator; and
providing a second lost-motion connection between said pilot valve and said single actuator;
said second lost-motion connection being smaller than said first lost-motion connection.

6. A method as in claim 1, wherein:
said aperture in said expansible valve closing member is closed by providing a lost-motion connection between said expansible valve closing member and an actuator of said expansible valve closing member.

7. A method as in claim 6, wherein:
said expansible valve closing member is made of an elastomer.

8. A method as in claim 7, wherein:
said expansible valve closing member is made of an elastomer harder than the elastomer of said expansible valve closing member.

9. A method as in claim 1, including:

providing a first lost-motion connection between said expansible valve closing member and an actuator of said expansible valve closing member; and providing a second lost-motion connection between said pilot valve and said actuator;

said second lost-motion connection being smaller than said first lost-motion connection.

10. A method as in claim 9, wherein:
said expansible valve closing member is made of an elastomer.

11. A method as in claim 10, wherein:
said expansible valve closing member is made of an elastomer harder than the elastomer of said expansible valve closing member.

12. In a valve apparatus having a valve seat,
an expansible valve closing member for said valve seat;
an aperture in said expansible valve closing member in parallel to said valve seat; and
a pilot valve at said aperture for closing said aperture;
said pilot valve being of a harder material than said expansible valve closing member.

13. A valve apparatus as in claim 12, wherein:
said expansible valve closing member is of an elastomer.

14. A valve apparatus as in claim 13, wherein:
said pilot valve is of an elastomer harder than the elastomer of said expansible valve closing member.

15. Apparatus as in claim 12, wherein:
said expansible valve closing member, said aperture, and said pilot valve are concentric.

16. In a valve apparatus having a valve seat,
an expansible valve closing member for said valve seat;
an aperture in said expansible valve closing member in parallel to said valve seat;
a pilot valve at said aperture for closing said aperture;
said pilot valve being of a harder material than said expansible valve closing member;
a single actuator for said expansible valve closing member and for said pilot valve;
a first lost-motion connection between said expansible valve closing member and said single actuator; and
a second lost-motion connection between said pilot valve
and said single actuator;
said second lost-motion connection being smaller than said first lost-motion connection.

17. A valve apparatus as in claim 16, wherein:
said expansible valve closing member is of an elastomer.

18. A valve apparatus as in claim 17, wherein:
said pilot valve is of an elastomer harder than the elastomer of said expansible valve closing member.

19. Apparatus as in claim 16, wherein:
said single valve actuator includes a flapper;
said expansible valve closing member mounted via said first lost-motion connection on said flapper; and
said pilot valve mounted via said second lost-motion connection on said flapper.

* * * * *